United States Patent
Amin et al.

[19]

[11] Patent Number: 5,953,652
[45] Date of Patent: Sep. 14, 1999

[54] DETECTION OF FRAUDULENTLY REGISTERED MOBILE PHONES

[75] Inventors: Umesh J. Amin, Redmond; Lorin B. Rowe, Bellevue; Russell John Waughman, Kirkland, all of Wash.

[73] Assignee: AT&T Wireless Services Inc., Redmond, Wash.

[21] Appl. No.: 08/788,151

[22] Filed: Jan. 24, 1997

[51] Int. Cl.⁶ .................................................. H04Q 7/34
[52] U.S. Cl. ............................................. 455/410; 455/435
[58] Field of Search ..................................... 455/410, 411, 455/435, 432, 433, 441, 422

[56] References Cited

U.S. PATENT DOCUMENTS

| | | | |
|---|---|---|---|
| 5,243,652 | 9/1993 | Teare et al. | 380/21 |
| 5,329,573 | 7/1994 | Chang et al. | 379/58 |
| 5,335,265 | 8/1994 | Cooper et al. | 379/59 |
| 5,345,595 | 9/1994 | Johnson et al. | 455/33.1 |
| 5,420,908 | 5/1995 | Hodges et al. | 379/58 |
| 5,438,570 | 8/1995 | Karras et al. | 370/94.2 |
| 5,455,863 | 10/1995 | Brown et al. | 380/23 |
| 5,481,611 | 1/1996 | Owens et al. . | |
| 5,483,465 | 1/1996 | Grube et al. | 455/410 X |
| 5,509,075 | 4/1996 | Grube et al. | 380/23 |
| 5,535,431 | 7/1996 | Grube et al. | 455/54.1 |
| 5,537,474 | 7/1996 | Brown et al. | 380/23 |
| 5,541,977 | 7/1996 | Hodges et al. | 379/58 |
| 5,734,977 | 3/1998 | Sanmugam | 455/410 |

FOREIGN PATENT DOCUMENTS

| | | |
|---|---|---|
| 0 336 079 A2 | 10/1989 | European Pat. Off. . |
| WO 96-15643 | 5/1996 | WIPO . |

OTHER PUBLICATIONS

Sales Brochure of Call Completion Analysis System for SS#7 Roamer Support and Fraud Detection, Model No. CCS–401 B/7 or C/7 (series 4.0) including Fraud Finder, CellTracker and CloneCatcher manufactured by Tekno Industries Inc. and believed to have been published on or before Aug. 16, 1996.

*Primary Examiner*—Wellington Chin
*Assistant Examiner*—Philip J. Sobutka

[57] ABSTRACT

A system and method is provided for detecting fraudulent use of a unique identifier associated with an authorized mobile station in a wireless telecommunications network. A monitoring system passively collects data associated with the registration of one or more mobile stations utilizing the unique identifier. A fraud detection processor analyzes the collected data using a first pattern recognition device. The pattern recognition device determines the periodicity of successive registration messages associated with the unique identifier of the authorized mobile station and a suspected fraudulent event is identified when the time between successive registration messages is non-periodic. A second pattern recognition device may be utilized alone or in combination with the first pattern recognition device to identify suspected fraudulent activity when an apparent velocity of the mobile station utilizing the unique identifier between successive registration messages exceeds a predetermined maximum velocity. The apparent velocity is based upon the approximated geographical distance and time between successive registration messages. Upon the detection of a suspected fraudulent event by the first and/or second pattern recognition devices, an authentication system may be utilized to identify a suspected mobile station as an unauthorized mobile station when a response to an authentication challenge received from the suspected mobile station is not substantially the same as a predicted response calculated by the authentication system based upon at least the unique identifier of the authorized mobile station.

29 Claims, 7 Drawing Sheets

DETECTION OF FRAUDULENTLY REGISTERED MOBILE PHONES

BACKGROUND OF THE INVENTION

1. Field of the Invention

The present invention relates in general to wireless communications systems and, more particularly, to a system and method for detecting unauthorized use of a mobile station in a wireless telecommunications system.

2. Description of the Related Art

With the increased popularity of wireless telecommunications systems (e.g., wireless cellular telecommunications systems), telecommunication service providers offer many different types of telecommunication services to their respective customers. Such services are generally provided to users on a subscription basis and, therefore, such users are generally referred to as "subscribers."

With the increase in overall usage of such wireless telecommunications systems, the incidence of fraudulent and unauthorized usage has also increased at an alarming rate. For example, it is estimated that fraudulent calls in the U.S. make up as much as 5 percent to 30 percent of all calls completed and account for hundreds of millions of dollars in lost revenue to telecommunication service providers. In addition to lost revenue, the effect of such wireless fraud also includes degraded service to the subscriber base, increased operational costs and reduced network capacity due to excess traffic associated with fraudulent calls.

There are several different methods by which unscrupulous persons attempt to obtain fraudulent access to and initiate unauthorized calls within a wireless telecommunications system. As a result of the mobile nature of mobile stations (e.g., cellular telephones), many of these methods of committing wireless fraud are extremely difficult to detect and prevent.

One such method of committing wireless fraud is known as "cloning fraud." Cloning fraud typically involves the misappropriation of a valid set of subscriber identification numbers (e.g., mobile identification number (MIN) and electronic serial number (ESN)) and programming the misappropriated MIN/ESN into at least one mobile station. When the "cloned" mobile station is fraudulently used to initiate calls over the wireless telecommunications network, the network, believing the unauthorized user to be the valid subscriber whose MIN/ESN was misappropriated, is deceived into providing such wireless services to the unauthorized user.

To combat wireless fraud, telecommunications service providers have resorted to a number of fraud detection and prevention systems. For instance, one proposed solution to identify cloning fraud involves the collection of call detail records associated with calls completed in the wireless network to identify concurrent call originations or receptions for a single subscriber identification number (MIN). Another proposed solution also includes the collection of call detail records associated with calls actually completed in the wireless network to determine whether the time interval between successive calls for a particular subscriber identification number (MIN) is too short to justify the geographic separation of the subscriber's mobile station for the successive calls. In yet another proposed solution, a subscriber's past calling activity is collected to formulate a historical usage pattern and any calls initiated by the subscriber that deviate from the historical usage pattern are identified as potentially fraudulent. Still another proposed solution performs a velocity check to identify potential cloning fraud by comparing the number of calls initiated by a subscriber within a discrete period of time to a minimum threshold number indicative of fraud.

A shortcoming of these conventional fraud detection systems is that they cannot identify such wireless fraud (e.g., cloning fraud) until after the fraudulent activity has occurred. That is, these conventional fraud detection systems generally require that the unauthorized user have actually placed the fraudulent call before the wireless fraud can be detected.

SUMMARY OF THE INVENTION

The above-described problems and shortcomings of such prior art systems are solved and a technical advance is made over the prior art in accordance with the present invention by providing a system and method for detecting unauthorized use of a mobile station that functions in real time to automatically identify existing fraudulent activity and potentially fraudulent activity.

In accordance with the present invention, a system and method is provided for detecting fraudulent use of a unique identifier associated with an authorized mobile station in a wireless telecommunications network. A monitoring system collects data associated with the registration of one or more mobile stations utilizing the unique identifier. A fraud detection processor analyzes The collected data using a first pattern recognition device. The pattern recognition device determines the periodicity of successive registration messages associated with the unique identifier of the authorized mobile station and a suspected fraudulent event is identified when the time between successive registration messages is non-periodic.

A second pattern recognition device may be utilized alone or in combination with the first pattern recognition device to identify suspected fraudulent activity when an apparent velocity of the mobile station utilizing the unique identifier between the successive registration messages exceeds a predetermined maximum velocity. The apparent velocity is based upon the approximated geographical distance and time between successive registration messages.

Upon the detection of a suspected fraudulent event by the first and/or second pattern recognition devices, an authentication system may be utilized to identify which of several mobile stations is an unauthorized mobile station. When a response to an authentication challenge received from the suspected mobile station is the same as a predicted response calculated by the authentication system based upon at least the unique identifier of the authorized mobile station, then this mobile station is the authorized mobile station. It follows that the other mobile station(s) must be unauthorized and action may be taken to prevent these unauthorized mobile stations from further calling activity.

BRIEF DESCRIPTION OF THE DRAWINGS

The foregoing features and other aspects of the invention are explained in the following description taken in connection with the accompanying drawings wherein.

DETAILED DESCRIPTION

Figure 1:
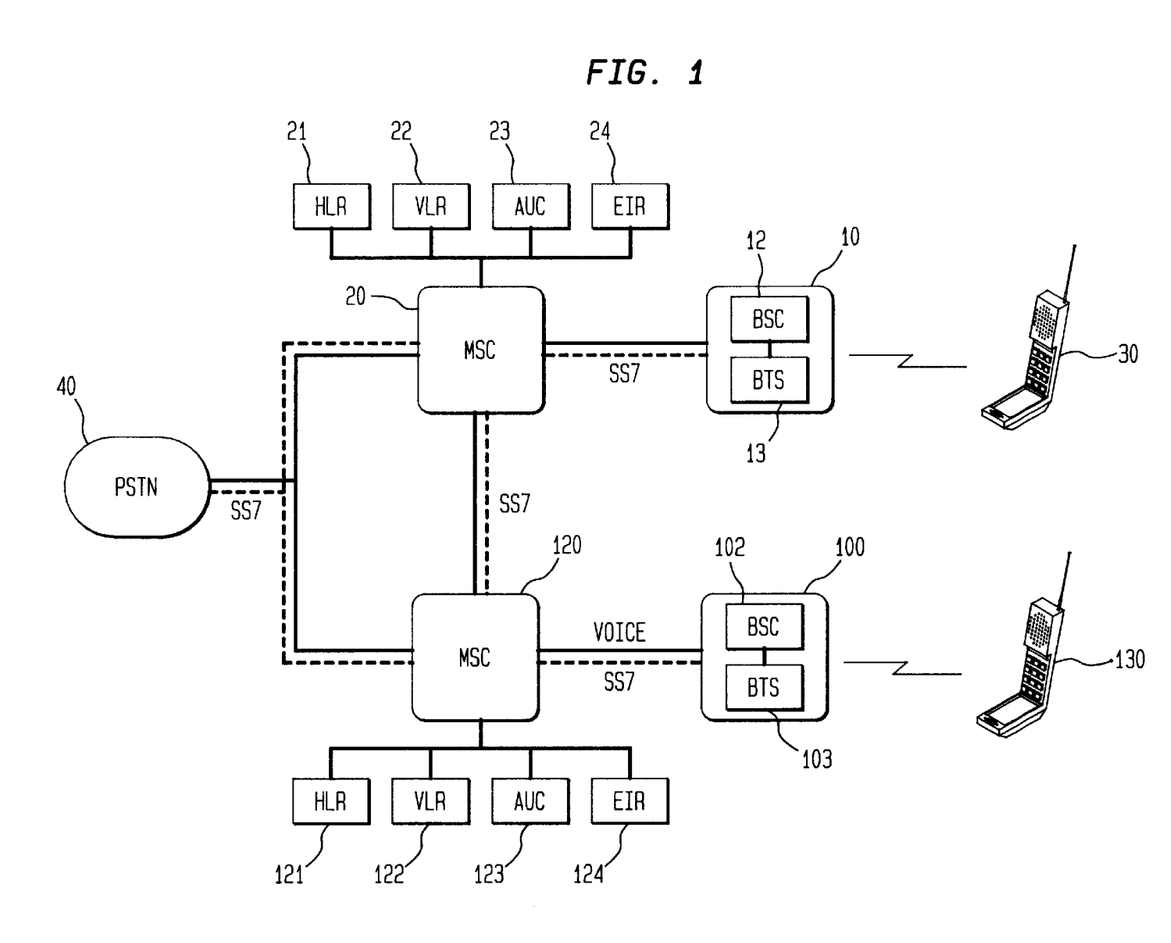
FIG. 1 is a block diagram illustrating the interconnections between a mobile station, a base station system, a mobile switching center and the public switched telephone network.

While it is understood that the present invention is not necessarily limited to cellular telecommunications networks, FIG. 1 illustrates a typical cellular telecommunications system in which the present invention may be utilized. In such a system, conventional cellular technology is applied to allow the same frequencies of a common allocated radio bandwidth to be reused in separated local areas or cells of a broader region.

Although it is understood that a typical cellular telecommunications system may have any number of cells, FIG. 1 illustrates two representative cells of the cellular telecommunications system. Generally, each cell of the cellular network is served by a base station system 10 or 100 comprising a group of local transceivers connected to a common antenna.

The base station systems 10, 100, each typically comprising a base station controller (BSC) 12, 102 and at least one base station transceiver (BTS) 13, 103, are interconnected via a switching system, commonly referred to as a mobile switching center (MSC) 20, 120. The MSC 20, 120 is used for switching calls involving at least one mobile station 30, 130 and for much of the system processing. The MSC 20, 120 is also connected to the public switched telephone network (PSTN) 40 for communicating with land-based stations (not shown).

Base station system 10 and mobile station 30 communicate via radio connections. Base station system 10 is also connected via trunks to carry the voice or data, and control messages between mobile station 30 and MSC 20. It is understood that base station system 100 illustrated in FIG. 1 operates in an identical fashion with respect to mobile station 130 and MSC 120.

Wireless telecommunications networks such as that illustrated in FIG. 1 typically comprise many units that need to communicate signaling information for controlling establishment of connections. Such signalling information is typically communicated over links or channels separate from the channels carrying actual voice or data communications between the customers being connected. Among the units that need to communicate are the mobile stations 30, 130, the base station systems 10, 100 connected by radio to the mobile station 30, 130, the MSC 20, 120 and the various databases that are consulted for the establishment of mobile calls (including the home location register (HLR) 21, 121; the visitor location register (VLR) 22, 122; the authentication center (AUC) 23, 123; and the equipment identity register (EIR) 24, 124). These databases are described below.

Although not illustrated, it is understood that HLR, VLR, AUC and EIR databases may be separate nodes from the associated MSC and may be directly accessed from other MSC's within the network.

Assuming that a subscriber is registered in the particular service area of the MSC 20, HLR 21 contains data associated with that subscriber and is the main user database. MSC 20 is thus referred to as the "home MSC" whose HLR contains permanent data associated with that particular subscriber. The data stored in HLR 21 is the permanent data that is independent of the subscriber's present location within the wireless telecommunications network, plus temporary data such as the addresses of Service Centers that have stored short messages for a mobile station 30. These addresses are erased after the short messages have been delivered. HLR 21 also indicates the signaling system point code used to find a module that contains the VLR currently associated with the mobile station 30. HLR 21 may be connected to MSC 20 by a high-speed MAP interface.

The signaling system point code described above could be, for example, the CCITT signaling system 7 protocol (SS7), the ANSI (American standard) SS7 protocol or even the CCITT-defined X.25 protocol. Thus, while the signaling system point code is referred to hereinafter in terms of SS7 messages, it is understood the present invention is not limited to SS7 messaging and is equally applicable to other signalling systems as well (e.g., ANSI, X.25, etc.).

Because it is not expected for a subscriber to be constantly in the service area of the home MSC 20, each MSC 20, 120 generally comprises a VLR 22, 122 containing current temporary data for those mobile stations 30, 130 locally registered within the service area of the particular MSC 20, 120, including the present or most recently known area of the subscriber's mobile station, the on/off status of the subscriber's mobile station, and various security parameters. The MSC where the subscriber is locally registered is referred to as the "visiting MSC".

The VLR is used for both local and roaming subscribers and has an extensive data exchange with the subscriber's HLR. The VLR is accessed by the MSC for each call setup, and therefore the MSC will always have an associated VLR. Because extensive signalling occurs between the MSC and VLR, they will usually be co-located. Often, the VLR is integral with the switch.

AUC 23, 123 generally provides authentication and encryption parameters to screen for cloning fraud and provides data (cipher key) for encryption of the voice/data and control signals transmitted between the mobile station 30, 130 and the base station system 10, 100.

EIR 24, 124 retains a record of ranges of certified equipment identifications and ranges of or individual equipment identifications that are under observation or barred from service. Equipment identification information is received from the mobile station 30, 130 at the MSC 20, 120 and EIR 24, 124 is used to verify that the equipment number of the mobile station 30, 130 is certified for use in the network and is not on the observation or service barred list.

When a mobile station is first powered up within the cellular network, the mobile station's unique MIN (or International Mobile Subscriber Identification number (IMSI)) and ESN are used by the mobile station in a conventional manner to identify and register itself with the MSC serving the area within the network the mobile station is located (visiting MSC). Such registration generally accomplished by determining which base station system and associated MSC provides the greatest signal strength to the mobile station. Thus, the location area of the mobile station within the cellular network is determined by ascertaining which MSC the mobile station is currently registered with.

The mobile station continues to monitor the broadcast control channel (BCCH) for the identity of its location.

When changes are noted, the mobile station issues a Location Update Request (LUR) that will register the mobile in the new location. If the mobile station roams into an area supported by a different MSC and VLR, then the VLR will issue a new Mobile Subscriber Roaming Number (MSRN). The HLR associated with the home MSC is then provided with information about the mobile station's new MSRN. Alternatively, the VLR can inform the HLR of the current MSC location and the MSRN can then be transacted between the MSC and the HLR. At certain time intervals, the mobile station will be requested to provide Periodic Registration (PR) to update the VLR and HLR files on the mobile station's location and status.

Figure 2:
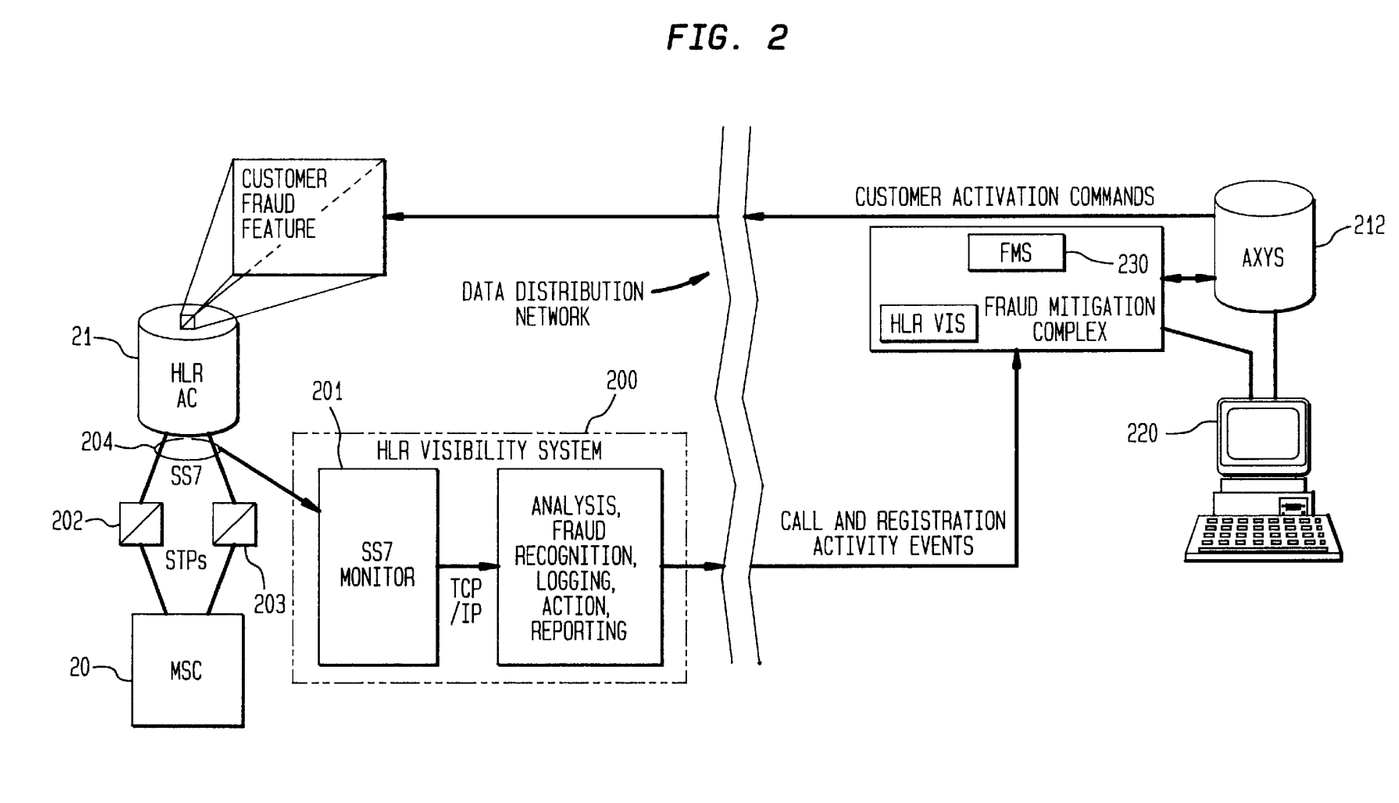
FIG. 2 is a block diagram illustrating the architectural details of the fraud detection system according to the present invention.
Figure 3:
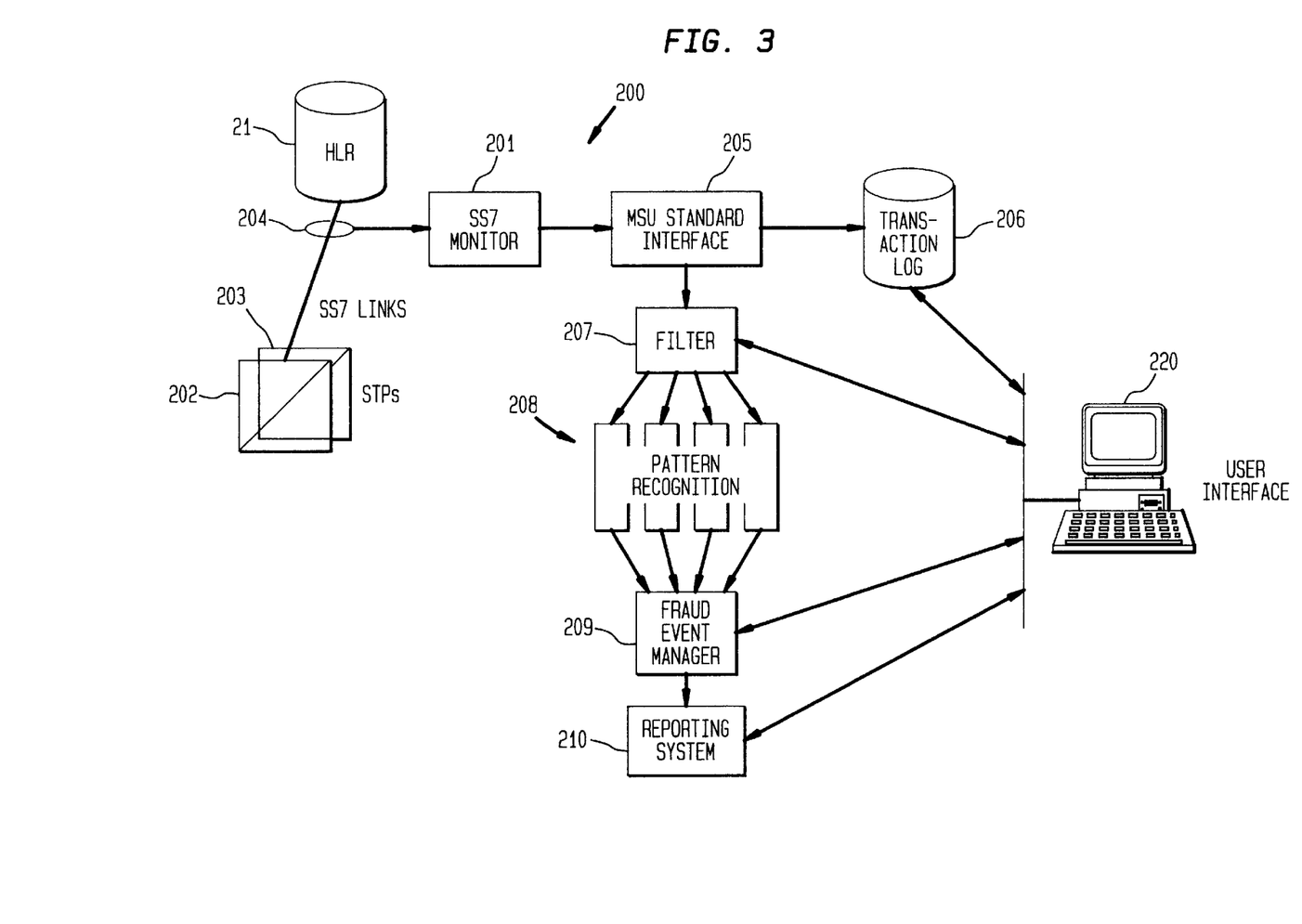
FIG. 3 is a block diagram further illustrating the fraud detection system illustrated in FIG. 2.

FIGS. 2 and 3 illustrate the preferred architecture of the fraud detection system 200 according to the present invention. With reference to FIGS. 2 and 3, a fraud detection system (HLR Visibility System) 200 is provided that may interoperate with several network elements already in place in conventional wireless networks, including the MSC 20, HLR 21, Fraud Management System (FMS) 230 and Business Support System 212 (the database of customer account information, such as name, address, services subscribed to, etc.). The FMS 230 is part of the Fraud Mitigation Complex associated with the wireless network.

As illustrated in FIGS. 2 and 3, MSC 20 is communicatively connected to HLR 21 via a signaling data network. A typical network would comprise data links or channels (e.g., SS7 data links) and data switching elements 202, 203 (e.g., Signalling Transfer Points (STP)). It is over these data links that messages (including mobile station registration signals) are communicated between the MSC 20 and HLR 21. While it is understood that the present invention is applicable with several different types of signaling systems, SS7 and IS41 will be referred to hereinafter for clarity and illustrative purposes only.

The fraud detection system 200 preferably includes a monitoring system 201 that passively collects SS7 messages going to and from the HLR 21. Preferably, the monitoring system 201 passively monitors the SS7 messages using a passive monitor tap 204, such as a commercially available ADC Patchmate panel, which feeds the SS7 messages to the monitoring system 201. It is understood, however, that the SS7 messages could also be captured and analyzed directly at HLR 21, or at the data link switching elements 202, 203.

The monitoring system 201 should preferably be capable of passively monitoring a plurality of data links without loosing messages. The monitoring system 201 time stamps each message, which time stamp is preferably to an accuracy of 1 millisecond resolution (plus or minus 1 millisecond) per hour variance from GMT. Furthermore, the monitoring system 201 preferably sends the monitored messages across an ethernet link using TCP/IP protocol.

One commercially available monitoring system 201 that may be utilized in accordance with the present invention is an INET Turbo-7 SS7 Analyzer, which is a packaged DOS-based 486 personal computer that operates on Turbo-7 "SPI NODE" software. Alternatively, a Tecelec STP may be utilized for forwarding the data link messages.

The messages forwarded by the Monitoring System 201 should preferably include a header block and binary data. The header block contains at least a time stamp, the data link number being monitored, the direction the message is going, and the length of the binary data which is the SS7 message.

Because the monitoring system 201 may also monitor a data link that carries several types of signaling protocol that are substantially the same (e.g., IS41, a North American standard, and proprietary mobility management signaling from other vendor's MSCs), the fraud detection system 200 converts any non-IS41B message (MTUP) into IS41 counterparts. The fraud detection system 200 will place messages in standard format. This format will pair SS7 transactions, which, according to IS41 protocol, are typically, but are not limited to, a series of independent transactions. Each transaction comprises an INVOKE message signaling unit (MSU) between two network elements (such as the MSC and HLR), and a RETURN RESULT between the same two network elements. The fraud detection system 200 looks for these INVOKE and RETURN RESULTS MSUs to create a single data element of a transaction. The message will then be placed into the fraud detection system's defined format.

A MSU Standard Interface 205 is preferably connected to the monitoring system 201 via an ethernet connection and collects MSU's from the wireless network and forward the collected MSU's to the fraud detection system 200 in a standardized format. The MSU Standard Interface 205 preferably includes the following capabilities:

transaction pairing to provide both the INVOKE and RETURN RESULT as a transaction pair translation of proprietary mobility management MSUs to IS41 equivalents filters unnecessary message types and forwards transactions to pattern recognizers forwards all messages to logging function A transaction log or database 206 is connected to the MSU Standard Interface 205 and stores all SS7 messages coming into the fraud detection system 200 into log files. All MSU's are captured into log files in a manner that data can be retrieved by an authorized fraud analyst at user interface 220 using keyed fields, such as MIN, date, time and message type. In addition, the log file display is configured to select messages in the following manner: date range, start time, stop time, MIN range, ESN or message type.

The messages are stored into a transaction log or database 206 for later retrieval and messages that are not required by the pattern recognizers 208 are also filtered out by data filter 207. The data filter 207 functions to reduce tile record processing load on each pattern recognizer 208. Filtering may be accomplished based upon message type, MIN, system identification (SID) or point code.

The filtered messages are then forwarded within the fraud detection system 200 to pattern recognizers 208, which contain user-defined pattern recognition algorithms indicative of fraud and process the filtered SS7 messages as they arrive to identify potentially fraudulent activity. The pattern recognizers 208 run concurrently on each MSU pair of SS7 messages as they arrive at the pattern recognizers.

When one of the pattern recognizers 208 identifies a possible fraud condition, that condition is reported by the pattern recognizer 208 to the fraud event manager 209 as a possible or probable fraudulent event. The fraud event manager 209 logs each such fraudulent event with at least the following information: date, time, event type, MIN, MSCID, priority and level of confidence of fraud. Priority and level of confidence of fraud are defined based on the event type.

Market specific, service provider defined actions based upon the priority and level of confidence of the identified fraudulent event may then be automatically performed by the fraud event manager 209, which action may be tailored to the market environment, the probability of fraud and current subscriber status. Such actions may range from reporting the fraudulent event to requiring a user of a suspect mobile station to communicate with a fraud analyst of the service provider before initiating a call. The fraud event manager 209 is preferably capable of generating standard event messages through CCITT X.25 protocol, ethernet, and async ports to drive the network elements it will interface with. A reporting system 210 thereafter marks for reporting each fraud event communicated by the fraud event manager 209.

The MSU Standard Interface 205, transaction log 206, filter 207, pattern recognizers 208, fraud event manager 209 and reporting system 210 may be separate units or combined in a single programmable work station, such as a commercially available SUN SPARC 20 or equivalent work station.

The pattern recognition methods or algorithms applied by the pattern recognizers 208 include, but are not limited to, a geographic dispersion algorithm and periodicity algorithm.

The geographic dispersion method or algorithm analyzes the message received by the particular pattern recognizer 208 in which the method or algorithm is stored to identify unrealistic geographic movement between VLR's and authentication messages. The principle message to be monitored may be any message in the mobility management protocol that unambiguously identifies the location of the mobile station and any authentication message that unambiguously identifies a mobile station as successfully authenticating. A typical example of such a message to be monitored is the Registration Notification (IS41) messages (RegNot) and the Security Status Messages. The RegNot messages are generated every time a mobile station sends a registration message to the cell site, or when the mobile station attempts to initiate a call and there is no current VLR. The Security Status Message may be generated each time the mobile station authenticates and a parameter in the message indicates whether such authentication was successful.

A table of minimum travel times between all points in the wireless network is maintained in or is accessible by the pattern recognizer 208 in which the algorithm is stored. The minimum travel times stored in the table take into account the realities of Cellular Radio transmission distances.

The registration signals regularly generated by the mobile stations within the cellular network are utilized in accordance with the present invention to detect potentially fraudulent activity (e.g., cloning fraud). In conventional cellular networks, the mobile stations generate a registration signal approximately every 10 minutes to 20 minutes. Each time the mobile station moves and registers on a different MSC, the HLR associated with the home MSC receives and sends several SS7 IS 41 messages.

The pattern of Registration Notification (RegNot) messages is analyzed at the HLR and potentially counterfeit or fraudulent mobile stations are identified by searching for unrealistic movements between MSC's (e.g., from New York to Los Angeles in a period of 10 minutes). Detection of such unrealistic movement in a given period of time alerts the telecommunications service provider of a very high probability of the existence of cloning fraud.

Figure 4:
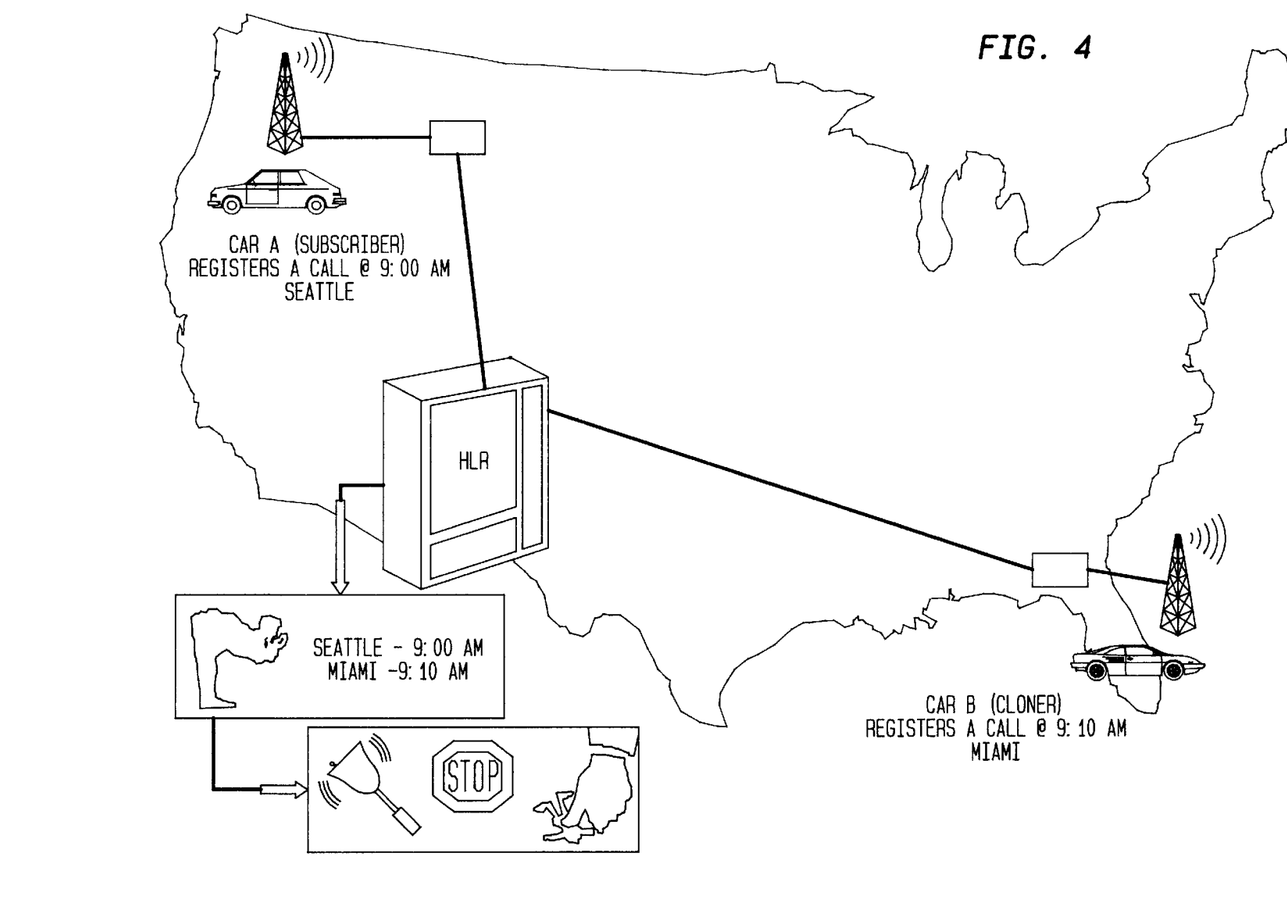
FIG. 4 is a flow diagram illustrating a pattern of IS41 Messages according to the present invention.

FIG. 4 is illustrative of the above-mentioned technique. If, for example, a mobile station located in Seattle, Wash. registers with the MSC covering that area (Seattle MSC) at 9:00 a.m., the Seattle MSC will send a RegNot message back to the HLR associated with that mobile station located, for instance, in Santa Barbara, Calif. If the power of a cloned mobile station located in Miami, Fla. is thereafter turned on at 9:10 a.m., the MSC covering that area (Miami MSC) will also send a RegNot message to the Santa Barbara HLR. By comparing the time of the registrations with the known distances between cellular coverage areas (e.g., the distance between Seattle and Miami), a high probability of cloning fraud is identified.

Figure 5:
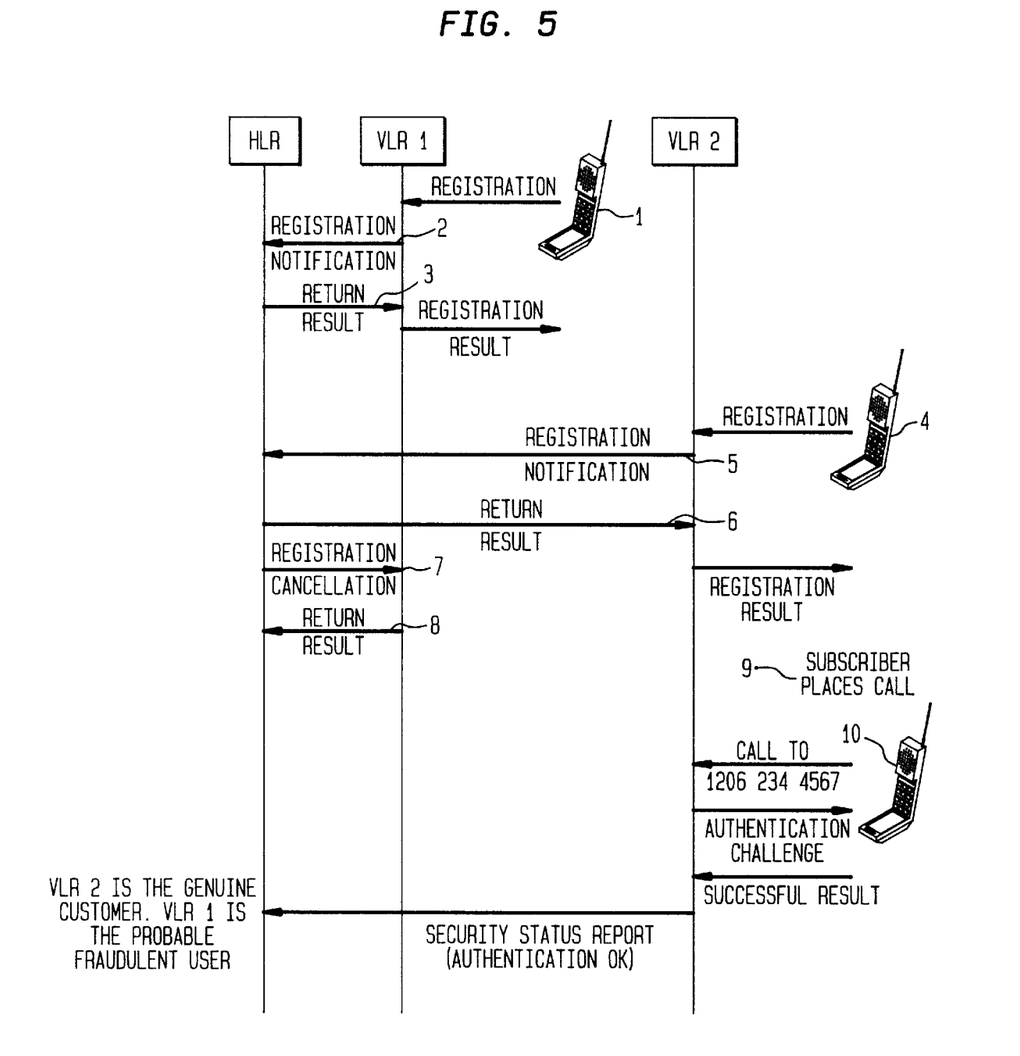
FIG. 5 is a flow diagram illustrating a representative pattern of messages applicable to the geographic dispersion fraud detection method according to the present invention.

Referring now to FIG. 5, there is illustrated a representative pattern of RegNot and Security Status Messages applicable to the geographic dispersion method or algorithm. At step 1 in FIG. 5, a first mobile station in the coverage area of VLR 1 registers autonomously on VLR 1 (authentication is not available on VLR 1). At step 2, VLR 1 identifies the MIN associated with the first mobile station, decodes the MIN to identify an HLR destination associated with the authorized subscriber, and sends a RegNot message to the HLR. The HLR looks up the MIN/ESN stored in its database and compares the stored MIN/ESN to the MIN/ESN contained in the received RegNot message. If the received MIN/ESN and stored MIN/ESN are the same, then the HLR sends a return result with the authorized subscriber's profile to VLR 1.

In step 3 illustrated in FIG. 5, VLR 1 constructs the subscriber's profile and sends a registration acknowledgement to the first mobile station. The first mobile station now initiates an internal timer and will re-register when the registration clock in the overhead messages reaches the re-registration time interval defined by VLR 1. This re-registration time interval is constant and is preferably between 10 and 30 minutes depending upon the particular VLR and MSC settings.

In step 4 illustrated in FIG. 5, a second mobile station (having the same MIN and ESN as the first mobile station in the coverage area of VLR 1) is turned on in the coverage area of VLR 2, which is geographically remote from the coverage area of VLR 1. If the second mobile station is equipped and set for autonomous registration and, if it is time to register, then the second mobile station will generate a registration attempt to VLR 2.

In step 5, VLR 2 identifies the MIN of the second mobile station, decodes the MIN to the HLR destination associated with the authorized subscriber and sends a RegNot message to the HLR. Once again, the HLR looks up the MIN/ESN stored in its database and compares the stored MIN/ESN to the MIN/ESN contained in the RegNot message received in step 5. If the received MIN/ESN and stored MIN/ESN are the same, then the HLR sends a return result with the subscriber's profile to VLR 2.

At this time, it is possible to detect that there is a possible cloned mobile station by analyzing the time intervals between steps 2 and 5. The distance between VLR 1 and VLR 2 is obtained from the table of distances preferably stored in the pattern recognizer 208. If the elapsed time interval is too short for the physical distance between VLR 1 and VLR 2, then a likelihood of cloning fraud is identified.

In step 6 of FIG. 5, VLR 2 constructs the subscriber's profile and sends a registration acknowledgement to the second mobile station in the coverage area of VLR 2. The second mobile station now initiates an internal timer and will re-register when the registration clock in the overhead messages reaches the re-registration time period or interval defined by the VLR 2. This re-registration time interval is also constant and is preferably between 10 and 30 minutes depending upon the particular VLR and MSC settings.

In step 7, the HLR cancels the old VLR record in VLR 1 by sending a Registration Cancellation (RegCanc) message to VLR 1. In step 8, VLR 1 deletes the VLR record in response to the RegCanc message and sends a return result message to the HLR indicating a successful cancellation.

Having identified a possible fraudulent event, VLR 2 is equipped and capable of making authentication (as discussed further below) when a call is initiated on the second mobile station in step 9. At this time, an authentication challenge is performed in a conventional manner at VLR 2 as illustrated in step 10. If the result to the authentication challenge is successful, the second mobile station is identified as the authorized mobile station and a report is sent back to the HLR Authentication Center (AC).

Thus, if the time between registrations (velocity) at VLR 1 and VLR 2 for a single MIN/ESN is unreasonably short for the geographic distance between VLR 1 and VLR 2, then there is a high probability that the first mobile station originally registered at VLR 1 is the cloned or fraudulent mobile station. Alternatively, if the result of the authentication challenge was unsuccessful, then there is a high probability that the second mobile station is the cloned mobile station.

It is understood that the above-mentioned scenario is illustrative of the manner in which the fraud detection system identifies potentially fraudulent activity and that the cloned mobile station may also be detected by several other combinations of registration and call events. For example, the fraud detection system would also have detected a cloned mobile station if the authorized subscriber had registered first on VLR 2 and placed a call, and then the unauthorized user on the cloned mobile station had registered on VLR 1 in an unrealistic time frame.

In addition to the geographic dispersion fraud detection method described above, the pattern recognizers 208 also detect cloning fraud within the cellular network using a periodicity method or algorithm to analyze the message received by the particular pattern recognizer 208. This periodicity method or algorithm utilizes the regular registration patterns of mobile stations within the cellular network that are in the service area of different MSC's (rather than necessarily being geographically dispersed as in the geographic dispersion fraud detection method described above).

Figure 6:
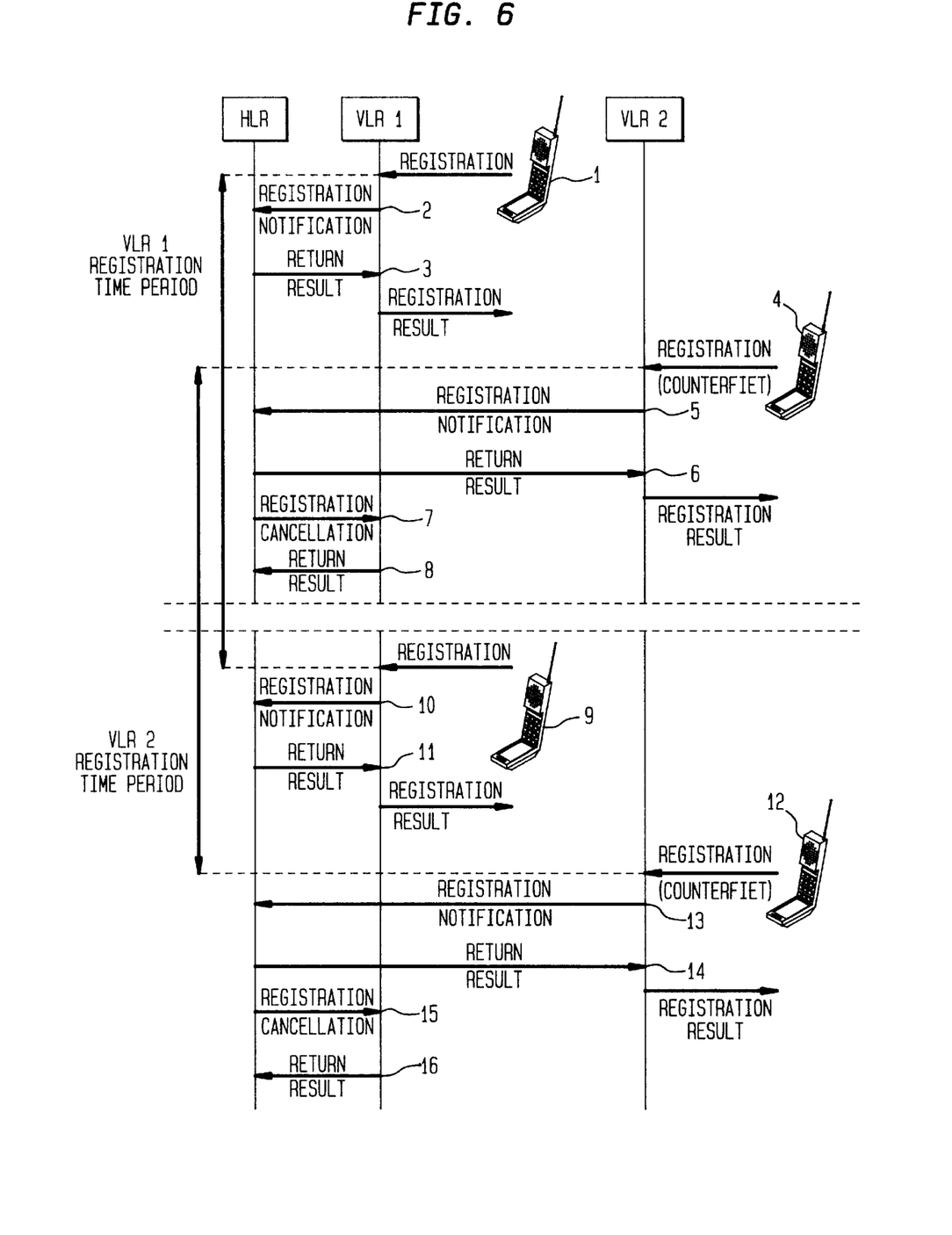
FIG. 6 is a flow diagram illustrating a representative pattern of messages applicable to the periodicity fraud detection method according to the present invention.
Figure 7:
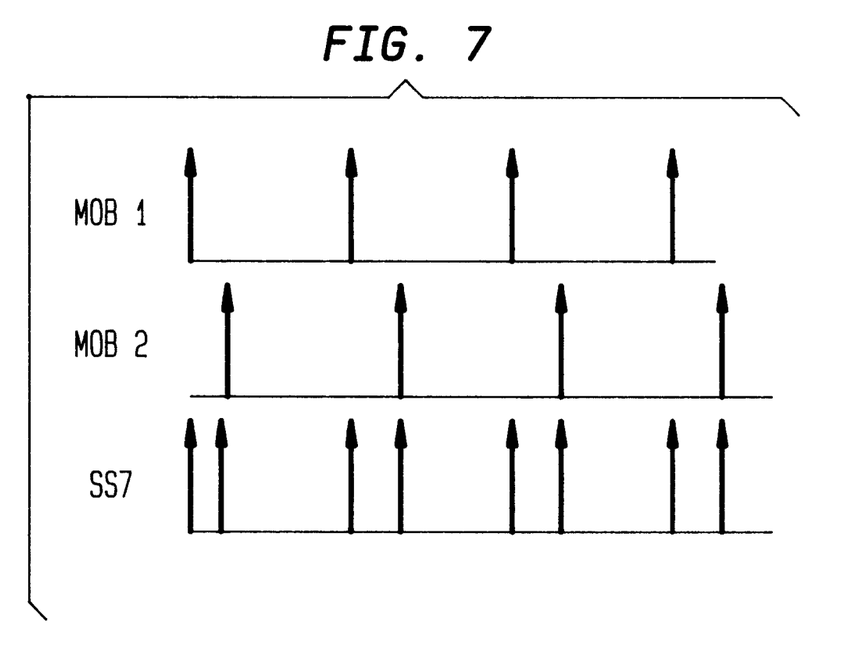
FIG. 7 is diagram illustrating a representative non-periodic pattern of registration (RegNot) messages indicative of cloning fraud in connection with the periodicity fraud detection method according to the present invention.

The periodicity fraud detection method or algorithm is illustrated in FIGS. 6 and 7 and is described below. Each subscriber's mobile station registers every time the overhead message "alarm clock" goes off or the system identification (SID) changes. When crossing a border from the coverage area of a first MSC into the coverage area of a second MSC, a registration is usually triggered as the clocks in each MSC are offset.

In addition, a significant number of subscribers' mobile stations may register several times on a single MSC. In general, these mobile stations are relatively immobile and situated deep within the coverage area of the serving MSC. Typically, if one were to view the data links associated with these mobile stations, there would be one registration back to the HLR and then nothing for several registration periods.

Furthermore, there is another group of subscribers that move on the coverage area border of more than one MSC. The mobile stations of these subscribers tend to generate random registrations depending upon the speed and location of the mobile station. Typically, every change between MSC's is identifiable on the HLR data links.

Thus, as is illustrated in FIGS. 6 and 7, should a cloned mobile station register at the same time as an authorized mobile station, then several detectable patterns of registration (RegNot) messages emerge that are indicative of cloning fraud.

Referring to step 1 illustrated in FIG. 6, a first mobile station in the coverage area of VLR 1 registers autonomously on the VLR 1 (authentication is not available on VLR 1). At step 2, VLR 1 identifies the MIN associated with the first mobile station, decodes the MIN to identify an HLR destination associated with the subscriber, and sends a RegNot message to the HLR. The HLR looks, up the MIN/ESN stored in its database and compares the stored MIN/ESN to the MIN/ESN contained in the received RegNot message. If the received MIN/ESN and stored MIN/ESN are the same, then the HLR sends a return result with the authorized subscriber's profile to VLR 1.

In step 3 illustrated in FIG. 6, VLR 1 constructs the subscriber's profile and sends a registration acknowledgement to the first mobile station. The first mobile station initiates an internal timer and will re-register when the registration clock in the overhead messages reaches the re-registration time interval defined by VLR 1 (e.g., the registration period set in VLR 1). This re-registration time period or interval is a constant and is preferably between 10 and 30 minutes depending upon the particular VLR and MSC settings.

In step 4 illustrated in FIG. 6, a second mobile station (having the same MIN and ESN as the mobile station in the coverage area of VLR 1) is turned on in the coverage area of VLR 2, which is geographically remote from the coverage area of VLR 1. If the second mobile station is equipped and set for autonomous registration and, if it is time to register, then the second mobile station generates a registration attempt to VLR 2.

In step 5 illustrated in FIG. 6, VLR 2 identifies the MIN of the second mobile station, decodes the MIN to the HLR destination associated with the authorized subscriber, and sends a RegNot message to the HLR. Once again, the HLR looks up the MIN/ESN stored in its database and compares the stored MIN/ESN to the MIN/ESN contained in the RegNot message received in step 5. If the received MIN/ESN and stored MIN/ESN are the same, then the HLR sends a return result with the subscriber's profile to VLR 2.

In step 6 illustrated in FIG. 6, VLR 2 constructs the subscriber's profile and sends a registration acknowledgement to the second mobile station in the coverage area of VLR 2. The second mobile station now initiates an internal timer and will re-register when the registration clock in the overhead messages reaches the re-registration time interval defined by VLR 2 (e.g., the registration period set in VLR 2). This re-registration time interval or period is a constant and is preferably between 10 and 30 minutes depending upon the particular VLR and MSC settings.

In step 7, the HLR cancels the old VLR record in VLR 1 by sending a Registration Cancellation (RegCanc) message to VLR 1. In step 8, VLR 1 deletes the VLR record in response to the RegCanc message and sends a return result message to the HLR indicating a successful cancellation.

In step 9 illustrated in FIG. 6, the first mobile station then re-registers with VLR 1 when the registration clock in the overhead messages reaches the re-registration time period set in and defined by VLR 1. In step 10, VLR 1 will once again identify the MIN associated with the first mobile station, decode the MIN to identify the HLR destination associated with the authorized subscriber, and send another RegNot message to the HLR. In response to the RegNot message, the HLR looks up the MIN/ESN stored in its database and compares the stored MIN/ESN to the MIN/ESN contained in the received RegNot message. If the received MIN/ESN and stored MIN/ESN are the same, then the HLR sends a return result with the authorized subscriber's profile to the VLR 1.

In step 11 illustrated in FIG. 6, VLR 1 again constructs the subscriber's profile and sends a registration acknowledgement to the first mobile station. The first mobile station initiates the internal timer and will re-register when the registration clock in the overhead messages reaches the re-registration time period defined by the VLR 1.

In step 12 illustrated in FIG. 6, the second mobile station (having the same MIN and ESN as the mobile station in the coverage area of VLR 1) then re-registers with VLR 2 when the registration clock in the overhead messages reaches the re-registration time period set in and defined by the VLR 2. At step 13, VLR 2 will once again identify the MIN associated with the second mobile station, decode the MIN to identify the HLR destination associated with the authorized subscriber, and send another RegNot message to the HLR. In response to this RegNot message, the HLR looks up the MIN/ESN stored in its database and compares the stored MIN/ESN to the MIN/ESN contained in the received RegNot message. If the received MIN/ESN and stored MIN/ESN are the same, then the HLR sends a return result with the authorized subscriber's profile to VLR 2.

In step 14 illustrated in FIG. 6, VLR 2 again constructs the authorized subscriber's profile and sends a registration acknowledgement to the second mobile station. The second mobile station initiates the internal timer and will re-register when the registration clock in the overhead messages reaches the re-registration time period defined by the VLR 2.

In step 15 of FIG. 6, the HLR cancels the old VLR record in VLR 1 by sending a Registration Cancellation (RegCanc) message to VLR 1. In step 16, VLR 1 deletes the VLR record in response to the RegCanc message and sends a return result message to the HLR indicating a successful cancellation.

This re-registration process between the first and second mobile stations may repeat itself in the manner described above depending upon the location and status of the mobile stations.

The time interval between steps 2 and 10 illustrated in FIG. 6 is substantially equivalent to the registration period for VLR 1 if the first mobile station: (1) does not move out of the coverage area of the MSC associated with VLR 1; (2) is not powered down; (3) does not re-scan onto another MSC; and (4) does not initiate a call. Similarly, the time interval between steps 5 and 13 is substantially equivalent to the registration period for VLR 2 if the second mobile station meets conditions similar to those discussed above with respect to the first mobile station.

Thus, cloning fraud may be identified by analyzing the SS7 RegNot messages for the first and second mobile stations at the HLR and/or pattern recognizers 208 and comparing the total number of RegNot messages associated with the MIN/ESN to the registration period of the MSC/VLR in which the mobile station is currently registered. This switch registration period may be determined by storing the registration periods for all of the MSC/VLR's in the network in a table and looking up the registration period for a desired MSC/VLR in which the mobile station is currently registered.

For example, assuming that the registration period for a first MSC (VLR 1) is set for 19 minutes and the registration period for a second MSC (VLR 2) is set for 21 minutes, then an authorized mobile station registered on the first MSC (VLR 1) and a cloned mobile station (having the same MIN and ESN as the authorized mobile station) registered on the second MSC (VLR 2) will cause SS7 RegNot messages to be generated in a pattern indicative of cloning fraud, such as that illustrated in FIG. 7.

In FIG. 7, each arrow represents an SS7 RegNot message associated with a particular MIN/ESN. Since the registration period for a particular MSC/VLR is constant, the first mobile station registered on the first MSC (VLR 1) in the above example generates a RegNot message every 19 minutes (the registration period set for the first MSC) to form a pattern of RegNot messages at 19 minute intervals. In the above example the second mobile station registered at the second MSC (VLR 2) generates a RegNot message every 21 minutes (the registration period set for the second MSC) to form a pattern of RegNot messages at 21 minute intervals. Because both mobile stations have the same MIN and ESN (e.g., one mobile station is a clone of an authorized mobile station), the combined RegNot messages for both the authorized and cloned mobile stations are forwarded as SS7 messages to the HLR where the permanent records associated with the subscriber's MIN are located.

Because the registration period for a particular MSC (VLR) is a constant, it is expected that the pattern of RegNot messages of an authorized subscriber's mobile station would be at discrete periodic intervals. Therefore, as illustrated in FIG. 7, when the pattern of RegNot messages for a particular subscriber is non-periodic (e.g., spaced apart at uneven intervals), then a cloned mobile station may be detected at the HLR and/or pattern recognizer 208.

Having identified a possible cloned mobile station, the MSC/VLR responsible for the coverage area in which the mobile station is located is equipped and capable of making authentication (as discussed further below) when a call is initiated on that mobile station. At this time, an authentication challenge may be performed in a conventional manner at the VLR. If the result to the authentication challenge is successful, the mobile station is identified as the authorized mobile station and a report is sent back to the HLR Authentication Center (AC). Alternatively, if the authentication result is unsuccessful, then the mobile station is identified as a clone and a report of the fraudulent event is generated.

While the above examples of the periodicity fraud detection method discuss analysis of the pattern of RegNot messages across two MSC/VLR's, it is understood that the present invention may be utilized to detect cloning fraud by analyzing a pattern of RegNot messages across more than two MSC/VLR's and/or where more than one cloned mobile station exists (each programmed to have the same MIN and ESN).

As discussed above, the geographic dispersion and/or periodicity fraud detection methods may be utilized to identify the existence of cloning fraud. To facilitate identification of the authorized subscriber's mobile station and the cloned mobile station, conventional authentication and encryption techniques may thereafter be utilized. As discussed below, conventional authentication and encryption techniques may include use of a challenge/response and encrypted data to identify the authorized mobile station.

One such authentication technique that may be utilized in accordance with the present invention to identify which of at least two mobile stations are authorized mobile station is described in European cellular communication system recommendations generated by Groupe Special Mobile (GSM). In general, this technique requires the subscriber to openly transmit a temporary mobile subscriber identification number (TMSI) to the base station system and/or MSC serving the mobile station, which in turn generates and transmits a random number (RAND) to the mobile station. The enciphering technique generally requires the mobile station to autonomously retrieve at least three enciphering elements from the memory of the mobile station (a predefined ciphering key, MIN and ESN). The mobile station then uses the ciphering key to encipher the MIN and ESN assigned to the mobile station to construct the RAND into a signed response (SRes), which is transmitted back to the base station system and/or MSC serving the mobile station.

The serving base station system and/or MSC thereafter looks up the mobile station's ciphering key, MIN and ESN stored in a database using the subscriber's TMSI. The serving base station system and/or MSC generates a predicted response to the same RAND using the information retrieved from the database and compares the SRes received from the mobile station to the predicted response generated by the base station system/MSC. If the responses are substantially equivalent, then the mobile station is considered to be authorized and authentication of the mobile station is granted.

Another known authentication technique that may be utilized with the present invention to identify which of at least two mobile stations is authorized is described in the United States Digital Cellular (USDC) standard known as IS-54 and IS-95. Like the above-described GSM authentication technique, the USDC technique utilizes a series of specialized messages communicated between the mobile station and the serving base station system/MSC before authentication is granted. However, the USDC authentication method utilizes a so-called "challenge-response" authentication between the mobile station and the serving base station system/MSC using a shared secret key (S-Key) that is not communicated over the wireless network. The S-Key is a key that is known only by the parties involved in the authentication.

The global challenge of the IS-54/95 protocols is preferably 32 bits in length (as compared to the 128 bit RAND used in the GSM authentication method). When the global challenge is mixed or encrypted with the S-Key, the result is an 18 bit SRes. Further processing using the same algorithm and additional shared secret data (or using a different algorithm) generates a message encryption algorithm key and voice privacy mask. A mobile station that fails to successfully complete the challenge-response authentication is considered to be an unauthorized or cloned mobile station.

Once the cloned mobile station is identified using the above-described fraud detection methods, the fraud detection system according to the present invention may take any of a variety of pre-defined actions to prevent further fraudulent activity, including generating a counterfeit alert to other processes and network elements within the cellular network to shut down or monitor the cloned mobile station.

The FMS 230 of the Fraud Mitigation Complex may be responsible for taking such action once the fraudulent event is identified. The FMS 230 should preferably have a flexible response for each detected type of fraud. The action to be taken by the FMS 230 may be defined by the telecommunications service provider based upon any of at least the following factors: the type of fraud detected, MIN, the MIN's current calling profile and/or the severity of the problem. It is understood that other factors may also be considered in determining the appropriate action to be taken in response to fraudulent activity.

Among the type of automatic actions that may be initiated by the FMS 230 are:

Placing an indicator against the subscriber's MIN to prevent further incoming or outgoing calls. If the subscriber attempts to place a call, the subscriber will be connected to a fraud analyst for further processing.

Placing an indicator against the subscriber's MIN to deny outgoing service (e.g., prevent initiation of calls), while not affecting incoming service.

Setting up a roam authorization on a per MSC or point code basis to deny service within the geographic coverage area of that MSC or point code for a predetermined period of time.

Command the serving MSC to tear down a call in progress on that MSC.

The FMS 230 should preferably be programmed with the intelligence to prevent repeat actions when the suspected counterfeiter (e.g., cloned mobile station) repeats the action that caused identification of the suspected cloning fraud in the first instance. In addition, FMS 230 may also contain a list of subscribers that should have no action taken against them. This may permit an operator to identify subscribers who have already been handled by other fraud mitigation techniques in the network.

It is also desirable to record such automatic actions taken by the FMS 230 in a log for audit and reconciliation purposes. This may be accomplished by sending a message in the Macrocell or AXYS customers record. Such log should preferably record all detected events, all actions taken, and be organized to allow a fraud analyst or other operator to analyze the data in at least the following ways:

All detected data for a given period of time.

All actions taken for a given period of time.

All actions taken with respect to a given MIN or set of MINs.

All detected events with respect to a given MIN or set of MINs.

All detected events with respect to a particular event detector.

All actions taken with respect to a particular event detector.

All actions prevented by repeat action.

All actions prevented because the subscriber is on a "no action" list.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method of detecting fraudulent use of a mobile station in a wireless telecommunications network, the mobile station having, a unique identifier associated therewith, the method comprising the steps of:

determining at least two actual elapsed time periods between successive registrations associated with the unique identifier of the mobile station; and detecting a suspected fraudulent event when the actual elapsed time periods between successive registrations are substantially non-periodic.

2. The method according to claim 1, further comprising the steps of:

identifying a switch in the wireless network where the mobile station is registered;

determining the constant registration period associated with the switch, the constant registration period defining the expected time period between successive registrations by the mobile station to the switch; and comparing the actual elapsed time period between successive registrations associated with the unique identifier of the mobile station to the constant registration period associated with the switch to determine whether the actual elapsed time period is substantially non-periodic.

3. The method according to claim 2, wherein the actual elapsed time period between successive registrations is substantially non-periodic when the actual elapsed time period corresponds to at least two different constant registration periods.

4. The method according to claim 1, further comprising the step of monitoring registration messages associated with the unique identifier to determine the actual elapsed time period between successive registrations.

5. The method according to claim 4, wherein the registration messages are passively monitored at the Home Location Register associated with the unique identifier of an authorized mobile station.

6. The method according to claim 1, further comprising the steps of:
receiving a response to an authentication challenge from the mobile station;
determining a predicted response based upon at least the unique identifier of the mobile station;
comparing the received response to the predicted response; and
identifying the mobile station as an unauthorized mobile station when the received response is not substantially the same as the predicted response.

7. The method according to claim 6, further comprising the step of providing an indication of a fraudulent event when the mobile station is identified as being unauthorized.

8. The method according to claim 6, further comprising the step of instructing the wireless telecommunications network to take a predefined action in response to identification of the mobile station as being unauthorized.

9. The method according to claim 1, further comprising the steps of:
determining the location of the mobile station within the wireless network at each registration associated with unique identifier;
determining the approximate distance between the determined locations for successive registrations associated with the unique identifier;
calculating an apparent velocity of the mobile station between successive registrations based upon the approximated distance and the actual elapsed time period between successive registrations;
comparing the apparent velocity with a predetermined maximum velocity; and
detecting a suspected fraudulent event when the apparent velocity exceeds the predetermined maximum velocity for successive registrations associated with the unique identifier of the mobile station.

10. The method according to claim 9, further comprising the steps of:
receiving a response to an authentication challenge from the mobile station;
determining a predicted response based upon at least the unique identifier of the mobile station;
comparing the received response to the predicted response; and
identifying the mobile station as an unauthorized mobile station when the received response is not substantially the same as the predicted response.

11. The method according to claim 10, further comprising the step of providing an indication of a fraudulent event when the mobile station is identified as being unauthorized.

12. The method according to claim 8, further comprising the step of instructing the wireless telecommunications network to take a predefined action in response to identification of the mobile station as being unauthorized.

13. A method of detecting fraudulent use of a unique identifier associated with an authorized mobile station in a wireless telecommunications network, comprising the steps of:
monitoring registration messages associated with the unique identifier;
determining a first elapsed time between successive first and second registration messages associated with the unique identifier;
determining a second elapsed time between the second registration and a successive third registration associated with the unique identifier;
detecting a suspected fraudulent event when the first and second elapsed times are not substantially the same.

14. The method according to claim 13, further comprising the steps of:
identifying at least one switch in the wireless network where a mobile station utilizing the unique identifier is registered;
determining the constant registration period associated with the switch, the constant registration period defining the expected time period between successive registrations by the mobile station;
comparing the elapsed time between successive registrations to the constant registration period associated with the switch; and
detecting a suspected fraudulent event when the first or second elapsed time is not substantially the same as the constant registration period.

15. The method according to claim 13, wherein the registration messages are passively monitored at the Home Location Register (HLR) associated with the unique identifier of the authorized mobile station.

16. The method according to claim 13, wherein the unique identifier is the unique mobile identification number (MIN) and equipment serial number (ESN) of the authorized mobile station.

17. The method according to claim 13, further comprising the steps of:
receiving a response to an authentication challenge from a suspected mobile station utilizing the unique identifier;
determining a predicted response based upon at least the unique identifier of the authorized mobile station;
comparing the received response to the predicted response; and
identifying the suspected mobile station as an unauthorized mobile station when the received response is not substantially the same as the predicted response.

18. The method according to claim 17, further comprising the step of providing an indication of a fraudulent event when the suspected mobile station is identified as being unauthorized.

19. The method according to claim 17, further comprising the step of instructing the wireless telecommunications network to take a predefined action in response to identification of the suspected mobile station as being unauthorized.

20. The method according to claim 13, further comprising the steps of:
monitoring the successive first and second registration messages associated with the unique identifier to determine the respective location of the mobile station within the wireless network at the time of each of the registration messages;

determining the approximate geographic distance between the respective locations of the mobile station at the time of the first and second registration messages;

calculating an apparent velocity of the mobile station between the first and second successive registration messages based upon the approximated geographical distance and the first elapsed time between the first and second successive registration messages;

comparing the apparent velocity with a predetermined maximum velocity; and detecting a suspected fraudulent event when the apparent velocity exceeds the predetermined maximum velocity.

21. The method according to claim 20, further comprising the steps of:

receiving a response to an authentication challenge from a suspected mobile station utilizing the unique identifier;

determining a predicted response based upon at least the unique identifier of the authorized mobile station;

comparing the received response to the predicted response; and identifying the suspected mobile station as an unauthorized mobile station when the received response is not substantially the same as the predicted response.

22. The method according to claim 21, further comprising the step of providing an indication of a fraudulent event when the suspected mobile station is identified as being unauthorized.

23. The method according to claim 21, further comprising the step of instructing the wireless telecommunications network to take a predefined action in response to identification of the suspected mobile station as being unauthorized.

24. A system for detecting fraudulent use of a unique identifier associated with an authorized mobile station in a wireless telecommunications network, comprising:

a monitoring system for collecting data associated with the registration of one or more mobile stations utilizing the unique identifier; and a fraud detection processor in communication with the monitoring system for analyzing the data collected by the monitoring system, the processor comprising a first pattern recognition device for determining the periodicity of successive registration messages associated with the unique identifier, wherein a suspected fraudulent event is identified when the time periods between successive registration messages are non-periodic.

25. The system according to claim 24, further comprising a passive monitor tap for passively monitoring data at the Home Location Register (HLR) associated with the unique identifier of the authorized mobile station, the passively monitored data being transmitted from the tap to the monitoring system.

26. The system according to claim 25, wherein the tap passively monitors data on at least one data link connected to the HLR.

27. The system according to claim 24, wherein the unique identifier is the unique mobile identification number (MIN) and equipment serial number (ESN) of the authorized mobile station.

28. The system according to claim 24, wherein the fraud detection processor further comprises a second pattern recognition device for identifying suspected fraudulent activity when an apparent velocity of the mobile station utilizing the unique identifier between successive registration messages exceeds a predetermined maximum velocity, the apparent velocity being based upon the approximated geographical distance and time between the successive registration messages.

29. The system according to claim 24, further comprising an authentication system for identifying a suspected mobile station as an unauthorized mobile station when a response to an authentication challenge received from the suspected mobile station is not substantially the same as a predicted response calculated by the authentication system based upon at least the unique identifier of the authorized mobile station.

* * * * *